(12) United States Patent
Yarborough

(10) Patent No.: US 7,308,710 B2
(45) Date of Patent: Dec. 11, 2007

(54) SECURED FTP ARCHITECTURE

(75) Inventor: William Jordan Yarborough, New York, NY (US)

(73) Assignee: JP Morgan Chase Bank, New York, NY (US)

(*) Notice: Subject to any disclaimer, the term of this patent is extended or adjusted under 35 U.S.C. 154(b) by 717 days.

(21) Appl. No.: 10/006,484

(22) Filed: Dec. 5, 2001

(65) Prior Publication Data

US 2003/0065950 A1    Apr. 3, 2003

Related U.S. Application Data

(60) Provisional application No. 60/325,634, filed on Sep. 28, 2001.

(51) Int. Cl.
*G06F 9/00* (2006.01)
(52) U.S. Cl. ......................... 726/11; 713/150
(58) Field of Classification Search ............ 713/200, 713/201, 188, 194, 1, 2, 151, 152, 150; 710/1–3; 711/101–104; 709/222, 227, 229, 230; 726/2, 726/11; 380/200, 201, 255, 277; 176/2; 715/748
See application file for complete search history.

(56) References Cited

U.S. PATENT DOCUMENTS 5,550,984 A    8/1996    Gelb (Continued)

FOREIGN PATENT DOCUMENTS

GB    2323757 A    9/1998
WO    WO-98/18248    4/1998

OTHER PUBLICATIONS

R. Fielding et al., *Network Working Group*, "Hypertext Transfer Protocol—HTTP/1.1", Jun. 1999.

(Continued)

*Primary Examiner*—Kim Vu
*Assistant Examiner*—Joseph Pan
(74) *Attorney, Agent, or Firm*—Goodwin Procter LLP

(57) ABSTRACT

A system for providing secured file transfer protocol ("FTP") services between a passive FTP client system coupled to a private network and a FTP server coupled to a public communication network, such as the Internet. The passive FTP client system requests a communication session with a first proxy server that is coupled to the private network. The passive FTP client system submits to the first proxy server the uniform resource locator ("URL") of a desired FTP server. The first proxy server initiates an outbound request from the private network, through a single port on a firewall, to a second proxy server that is coupled to the public communication network. The first proxy server submits the URL to the second proxy server. The second proxy server uses the URL to establish a FTP session with the desired FTP server. Upon receiving an identified socket provided by the FTP server for the data channel, the first proxy server changes the received data packets from the FTP server by substituting its own IP address for the FTP server's IP address, thus identifying a new socket on the first proxy server. The passive FTP client system transmits a FTP data request to the new socket on the first proxy server. The first proxy server forwards the data request to the FTP server via the outbound connection established with the second proxy server. All FTP data flows through a single port on the firewall.

25 Claims, 5 Drawing Sheets

U.S. PATENT DOCUMENTS

| | | |
|---|---|---|
| 5,623,601 A | 4/1997 | Vu |
| 5,778,174 A | 7/1998 | Cain |
| 5,864,683 A | 1/1999 | Boebert et al. |
| 6,061,796 A | 5/2000 | Chen et al. |
| 6,079,020 A | 6/2000 | Liu |
| 6,182,226 B1 | 1/2001 | Reid et al. |
| 6,219,706 B1* | 4/2001 | Fan et al. .................. 709/225 |
| 6,349,336 B1* | 2/2002 | Sit et al. ..................... 709/227 |
| 6,584,508 B1* | 6/2003 | Epstein et al. ............. 709/229 |
| 6,687,222 B1* | 2/2004 | Albert et al. ............... 370/230 |
| 6,687,245 B2* | 2/2004 | Fangman et al. ........... 370/356 |
| 6,718,535 B1* | 4/2004 | Underwood ................ 717/101 |
| 2002/0087447 A1* | 7/2002 | McDonald et al. .......... 705/36 |

OTHER PUBLICATIONS

S. Bellovin, *Network Working Group*, "Firewall-Friendly FTP", Feb. 1994.

Postel & Reynolds, *Network Working Group*, "File Transfer Protocol (FTP)", Oct. 1985.

\* cited by examiner

SECURED FTP ARCHITECTURE

CROSS-REFERENCE TO RELATED APPLICATIONS

This application is based upon and claims priority to U.S. provisional patent application Ser. No. 60/325,634 filed on Sep. 28, 2001, and entitled SECURED FTP ARCHITECTURE.

FIELD OF THE INVENTION

The present invention relates to network data communications, and more particularly to establishing secure transfer of data between one or more private client systems and one or more public hosts, in which the client systems and their respective networks are secured from unauthorized access.

BACKGROUND OF THE INVENTION

Users of networked computer systems desire to transfer data reliably and efficiently to and from other networked computer systems. File transfer protocol (hereinafter "FTP") is a service that runs on Transmission Control Protocol/Internet Protocol (hereinafter "TCP/IP") networked computer systems and provides for the ability to send and receive data to and from a plurality of TCP/IP networked computer systems. FTP has been used as a reliable method for transferring data for decades, in part because FTP moves large amounts of data efficiently and performs error checking to ensure accuracy. FTP enables a user of a computer system to log on to a remote computer system while maintaining local file and directory control. Furthermore, FTP allows users to transfer data to and from their computer systems in a plurality of data formats, for example binary data and ASCII text data.

A FTP session typically begins with a user identifying a uniform resource locator (hereinafter "URL") or, alternatively, an Internet Protocol (hereinafter "IP") address of a remote computer system. Computer systems that provide FTP services are referred to herein as "FTP servers." FTP servers are configured to provide private and/or public access to their data. FTP servers that provide private access require remote users to have proper authorization (e.g., authorized user identifications and passwords) in order to access data. FTP servers that provide public access permit users to be identified simply as "anonymous," and any (or even no) password enables access to data on the FTP server.

The abundance of users on global computer networks such as the Internet has encouraged the development of FTP "front-end" applications to provide user-friendly interfaces for data transfers to and from FTP servers. Such FTP front-end applications are installed on an end-user's computer system, and are referred to herein as "FTP client programs." FTP client programs communicate with FTP servers and implement essential elements of file transfer protocol without significant user intervention. For example, the need to "manually" type commands on a command line in order to effect data transfer between the FTP client program and a FTP server is eliminated. A plurality of FTP functions, for example downloading data, uploading data, listing files in directories and the like are performed via screen menus and other graphical user interface controls which dramatically simplify the FTP process for end-users.

FTP client programs typically initiate communication with FTP servers on logical communication port number 21. Logical communication port 21 is a "well-known" port that is usually reserved for FTP, and is not used by networked computer systems in other TCP/IP services (e.g., hypertext transfer protocol service). For example, a user connects to a FTP server having a particular IP address (e.g., 113.115.125.431) on logical communication port 21. The combination of a computer system's IP address and port number is referred to herein as a "socket," meaning a TCP socket.

Many publicly accessible FTP servers are registered with an Internet domain name server (hereinafter "DNS"), and have a DNS entry to simplify access. For example, a user can easily enter a well known DNS entry, e.g., ftp.lucasarts.com (a popular FTP server provided by Lucas Arts®, Inc.), and the corresponding IP address for ftp.lucasarts.com will be automatically provided by the DNS server. Furthermore, the FTP client program will communicate automatically with the FTP server on logical communication port 21 and implement the requirements of the protocol, for example, necessary syntax structure.

Once a FTP server receives a connection request from a FTP client program on logical communication port 21, the FTP server replies, usually by prompting the FTP client program for a User ID and associated password for authorization. Once the ID and password are authorized, the FTP server creates a FTP session.

The communication session between a FTP client program and a FTP server initially occurs over a "command channel." The command channel takes place on the IP address of the FTP server and logical communication port 21 and does not effect any transfer of data files. In order to transfer data files or respond to commands issued over the command channel between the FTP server and the FTP client program, a new socket pair (inherent in a TCP session) must be opened between the FTP server and FTP client to define a "data channel" over which data will be transferred.

At least two types of FTP client software program systems are available: passive and active. In a passive FTP client program, the FTP server identifies and opens a new socket for transferring data on the data channel. The new socket information is transmitted to the passive FTP client program and the passive FTP client program uses the newly opened socket on the FTP server to initiate a session from the FTP client to the FTP server for data transfers. In contrast, an active FTP client program identifies a new socket for communicating data requests, and the FTP server opens a corresponding logical communication port and a new session is initiated from the FTP server to the FTP client. The present invention preferably uses passive mode. Continuing now with the above example, after a specific data request has been received (e.g., a request for a directory listing), the FTP server identified by ftp.lucasarts.com informs a passive FTP client program over the command channel that data will be provided on a newly opened logical communication port which is dynamically assigned by the FTP server and unknown to the FTP client (e.g., port 1025) on the FTP server. The combination of the IP address of ftp.lucasarts.com and the newly opened logical communication port 1025 is the socket that will be used for the data channel. The new IP address and port number for the data channel is transmitted to the passive FTP client program.

The FTP client then initiates the session with the FTP server over the received IP address and port number and receives the data. Once complete, the socket used for the data channel after the data is successfully received by the passive FTP client program is closed. Any additional data requests by the passive FTP client program (e.g., a request for a file) are again transmitted to ftp.lucasarts.com over the command channel. The passive FTP client program thereafter receives another reply from ftp.lucasarts.com over the command channel that includes yet another new socket (e.g., the IP address of ftp.lucasarts.com and logical communication port 1030). This new socket is used for transferring the requested file over the data channel. The passive FTP client program retransmits its request to the FTP server for the file over the data channel using the newly identified socket, and the FTP server transmits the requested file over the data channel. At the end of the transmission, the new socket for the data channel is closed. This process continues while the passive FTP client program issues commands to the FTP server. The proliferation of users and services on global computer networks, such as the Internet, raises many security concerns for both users and service providers. Users want the data they submit to providers and the data they receive from providers to be free from unauthorized interruption and use. Similarly, service providers want their hosts and systems to be secured from unauthorized access or other types of intrusions by "hackers." Service providers, especially those involved with financial services, view their computing hardware and software platforms as critical assets. The protection of these assets is a paramount concern.

Service providers attempt to secure their hosts by interposing firewalls between their hosts and the user community. Firewalls are typically programmed to restrict inbound (defined herein as originating from outside a private network) access for a particular set of users and/or a particular set of hosts and/or ports, i.e., services. Firewalls are also typically programmed to restrict data traffic to specific sockets on host systems, thereby preventing the flow of data to unrecognized sockets.

Additional network security measures include the use of proxy servers that are typical personal computer servers installed to provide communications with client and server systems. In a system using a proxy server, the client system communicates with a proxy server which in turn communicates with a host. In such a configuration, a user of a passive FTP client program establishes a session with a proxy server and the proxy server establishes a session with a FTP server. Data requests sent over the command channel and data provided over the data channel are forwarded to and from proxy servers, thus enabling the passive FTP client program to send and receive data to and from a FTP server using a passive FTP client program. Proxy servers do not necessarily require any special operating system enhancements in order to function as proxy servers. However, some control programs typically run on proxy servers which can be written in any language suitable for programming, such as C++ or Java.

FIG. 1 shows an example of a typical prior art security hardware arrangement. In the example shown, the passive FTP client system 2 is coupled to private network 8, which is, for example, a corporation's intra-network such as a local area network (LAN) or a wide area network (WAN). Public network 6 is a global computer network such as the Internet. Firewall 10 is interposed between public network 6 and private network 8 and can include proxy services. Firewall 10 is configured such that users of the passive FTP client system 2 are permitted to initiate outbound communications with FTP servers 4 in order to transfer data to and/or from the FTP server 4 through public network 6. Firewall 10 is configured to reject inbound requests originating from systems outside of private network 8. Other configurations involving the use of firewalls and proxy servers are known and enable service providers to secure their hosts from systems outside of private network 8.

Continuing with the security arrangement shown in FIG. 1, a passive FTP client system 2 initiates a session request with the FTP server 4, for example by entering the URL of the FTP server 4 in the passive FTP client program. The passive FTP client program automatically provides the well-known logical communication port 21 to transmit the session request to the FTP server 4. After the FTP server 4 authorizes the user of the passive FTP client program, a command channel is established. When the FTP server 4 receives a request for data, the FTP server 4 transmits a new socket to the passive FTP client system 2 over which data will be transmitted. The passive FTP client system 2 retransmits its request for data to the new socket, and a data channel is established between the FTP server 4 and the passive FTP client system 2.

To accommodate the FTP client initiating a session with a FTP server over the received IP address and port of the FTP server, the firewall 10 opens and closes corresponding logical communication ports to enable data packets to pass between the passive FTP client system 2 and the FTP server 4. If the firewall 10 doesn't open a new communication port each time a new FTP client initiates a new session request to the FTP server, the data packets transmitted over the data channel are blocked because the FTP server IP address and port number are not recognized as a permitted outbound request by the firewall 10. After requested data are sent to the passive FTP client system 2 by the FTP server 4 over the data channel, the FTP server 4 and the firewall 10 dynamically close the corresponding logical communication ports until the next data channel transmission.

As noted above, each data channel data transmission that occurs during a FTP session takes place on a different socket on the FTP server 4. Therefore, due to the nature of FTP, firewall 10 must open and close corresponding logical communication ports for each data channel transmission. In a large networked environment wherein many passive FTP client systems 2 request data from a plurality of FTP servers, the number of ports opened and closed on the firewall 10 can be very high.

Providing for a dynamic opening and closing of ports on a firewall is problematic. The use of voluminous logical communication ports results in potential security exposures. Furthermore, significant administrative resources are required to configure a firewall to allow communication over a large range of sources and destinations.

Currently, no system is available which permits a client system to transfer data using FTP by way of a client proxy system configured to enable FTP services over a single outbound connection.

SUMMARY OF THE INVENTION

The foregoing discussion illustrates a need for a system which enables file transfer protocol communications in a secured hardware configuration involving the use of at least proxy servers and firewalls wherein only a single socket is opened on a firewall during the entire FTP session. The present invention advantageously enables a client proxy system to receive a FTP connection request from a passive FTP client program, forward the FTP request to the desired FTP server, and enable the passive FTP client system to transmit and receive data to and from the desired FTP server over a single outbound proxy connection, through a single port on a firewall. By providing a secured system including proxy servers and firewalls, the present invention drastically improves the security of FTP between a passive FTP client system and a FTP server.

The present invention further advantageously enables a FTP client proxy system to modify intercepted data packets received from a FTP server, and to rewrite the data packets by substituting the IP address of the client proxy system for sending data requests. The present invention provides for a plurality of FTP requests and replies over a single connection between two proxy servers.

Other features and advantages of the present invention will become apparent from the following description of the invention which refers to the accompanying drawings.

BRIEF DESCRIPTION OF THE DRAWING(S)

For the purposes of illustrating the invention, there is shown in the drawings a form which is presently preferred, it being understood, however, that the invention is not limited to the precise arrangements and instrumentalities shown. The features and advantages of the present invention will become apparent from the following description of the invention which refers to the accompanying drawings, in which.

DETAILED DESCRIPTION OF EMBODIMENTS OF THE INVENTION

The present invention enables a FTP data session between a passive FTP client system 2 and a FTP server 4 in secured hardware arrangement using extremely few administrative resources. Essentially, the requirements of opening and closing a plethora of logical communication ports on a firewall is eliminated by the present invention. A description of how this occurs is now provided with reference to FIG. 2 through FIG. 5.

Figure 1:
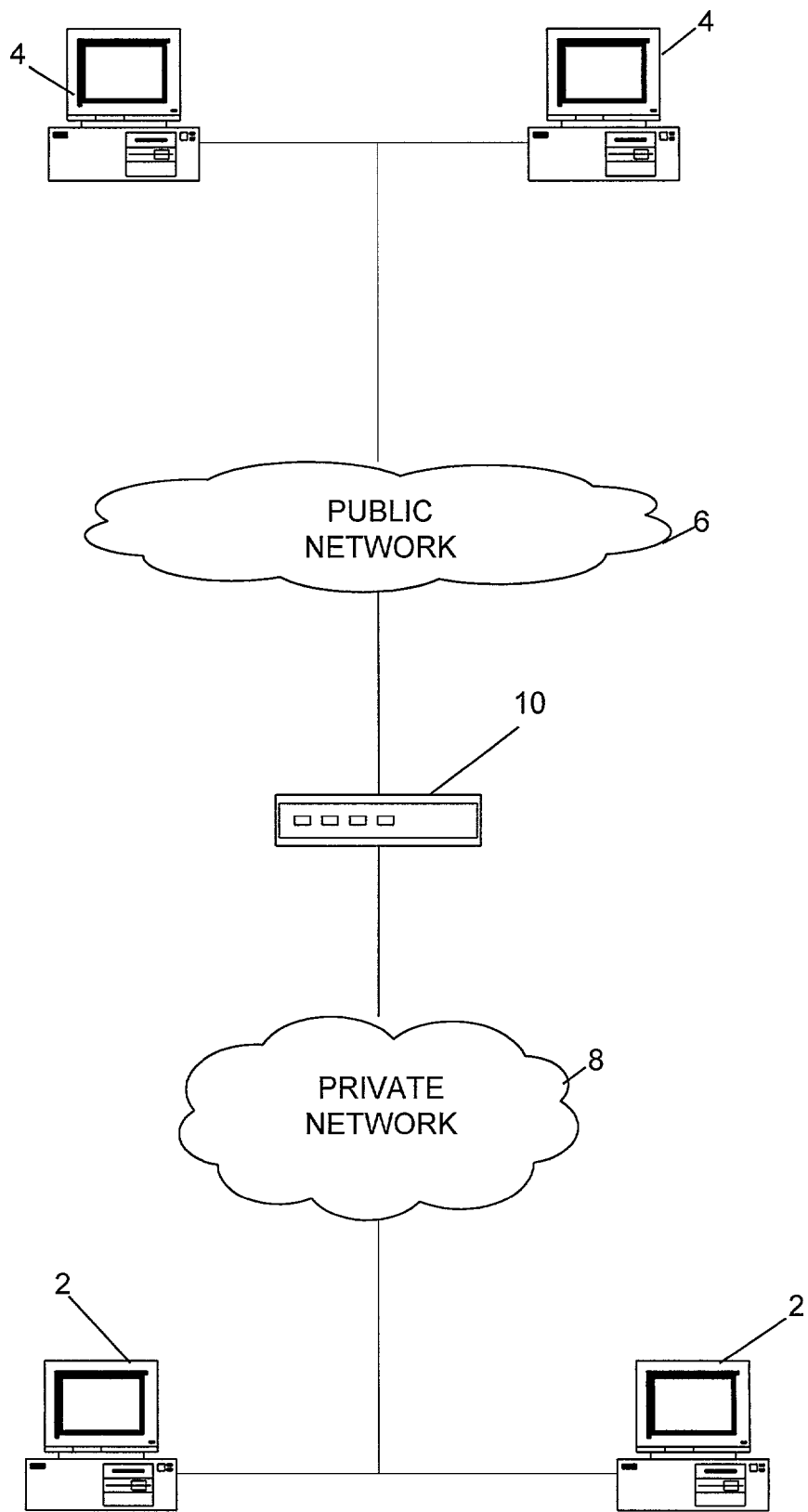
FIG. 1 is a diagram of a prior art security hardware arrangement.
Figure 2:
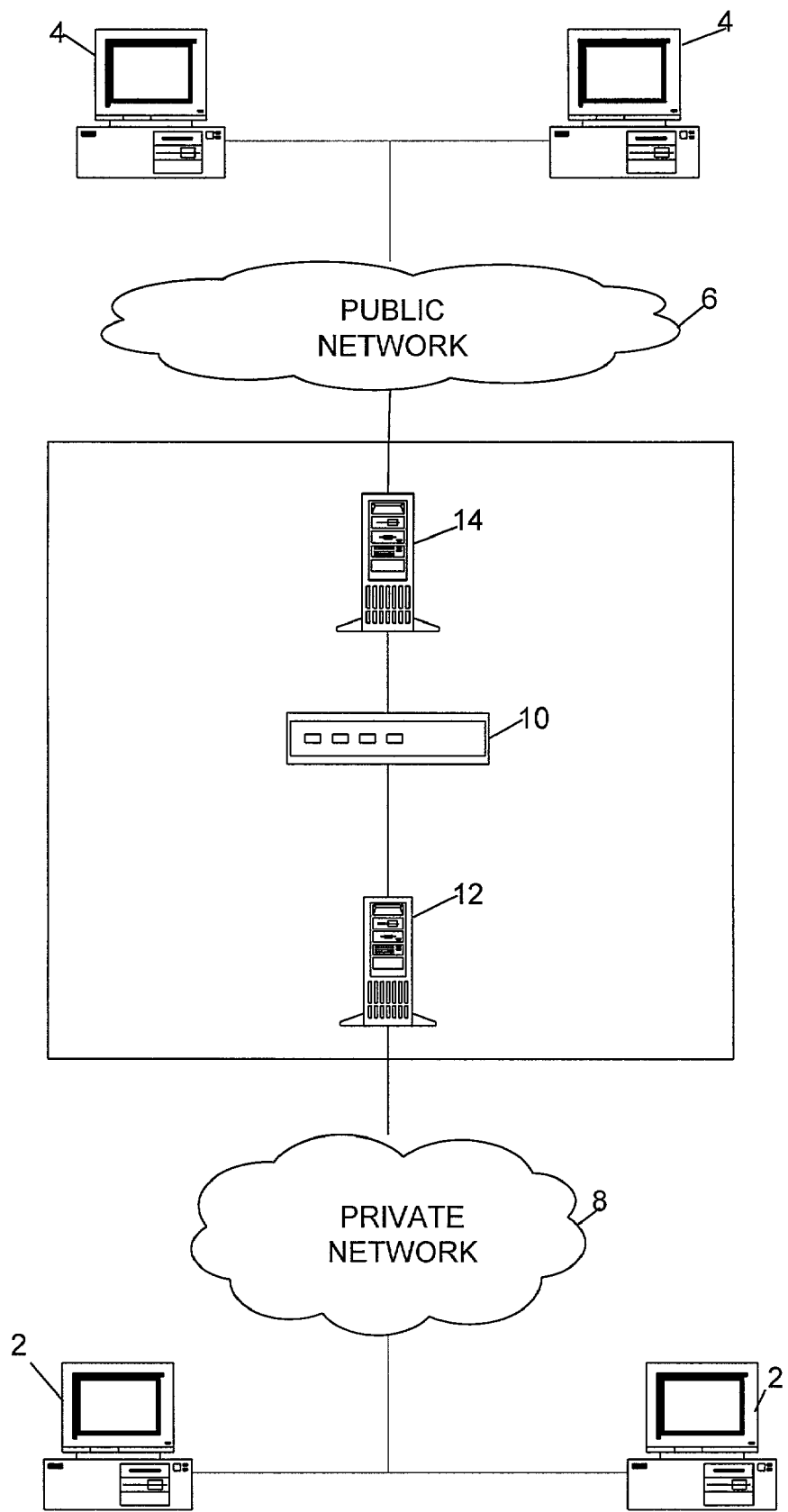
FIG. 2 is a diagram of the security hardware arrangement of the present invention.

FIG. 2 shows an example of a security hardware arrangement according to a preferred embodiment of the present invention. As shown in FIG. 2, a first proxy server, referred to herein as the FTP client proxy system 12, is coupled between a private network 8 and a firewall 10. A second proxy server, referred to herein as the FTP server agent 14, is coupled between public network 6 and the firewall 10. In a preferred embodiment of the present invention, firewall 10 is a typical packet firewall. The FTP client proxy system 12 is configured to receive session requests from a passive FTP client system 2 on a single, predetermined socket.

In a preferred embodiment, the FTP client proxy system 12 and the FTP server agent 14 are configured for three secured communication sessions. A first session is provided that employs encrypted communications using the secured sockets layer ("SSL") protocol between the FTP client proxy system 12 and the FTP server agent 14. A second session is configured for the SSL protocol and the lightweight directory access protocol ("LDAP") authentication between the FTP client proxy system 12 and the FTP server agent 14. The third session employs a combination of digital signature and SSL protocols between the FTP client proxy system 12 and the FTP server agent 14. The communication session that is established between the FTP client proxy system 12 and the FTP server agent 14 is referred to herein as the "FTP proxy control connection."

The decision to use one of the respective communication sessions (i.e., SSL, SSL with LDAP, or SSL with digital signature) between the FTP client proxy system 12 and the FTP server agent 14 depends, in part, upon the information being requested by the passive FTP client system 2. FTP servers 4 store data of varying sensitivity and, therefore, the data being requested by passive FTP client systems 2 require varying degrees of security. Accordingly, the FTP client proxy system 12 and the FTP server agent 14 employ an encrypted communication session relative to the degree of sensitivity of the data being requested. For example, if a user of the passive FTP client system 2 requests sensitive financial information stored on a FTP server 4, the user will have to provide LDAP identification (e.g., user name and password) to be authenticated.

In a preferred embodiment, the FTP client proxy system 12 reads a configuration file that identifies and designates logical communication ports for the respective secured communication sessions used by the FTP client proxy system 12 and the FTP server agent 14. When the FTP client proxy system 12 receives a request for data from a passive FTP client system 2, the FTP client proxy system 12 preferably references the configuration file and, for example, based upon URL of the FTP server 4, establishes one of the three above-described secure communication sessions with the FTP server agent 14.

Once the secured session is established between the FTP client proxy system 12 and the FTP server agent 14, the FTP client proxy system 12 preferably forwards the URL, i.e., the IP address and logical port number of the target FTP server 4, received from the passive FTP client system 2 to the FTP server agent 14. The FTP server agent 14 preferably establishes a FTP session with the FTP server 4, i.e., the FTP command channel. The encrypted session between the FTP client proxy system 12 and the FTP server agent 14 ensure that the transmissions between the two systems are secure.

The passive FTP client system 2 uses passive FTP client software to implement FTP services between the passive FTP client system 2 and the FTP client proxy system 12. When the FTP client proxy system 12 receives a FTP request (i.e., a FTP command) from the passive FTP client system 2, the request is preferably encrypted and transmitted to the FTP server agent 14 and delivered to the target FTP server 4. As described above, with regard to command and data channels, the FTP server 4 starts a new data service on an unpredictable port number, thus establishing the data channel. The new communication socket is preferably transmitted to the FTP server agent 14 and then forwarded to the FTP client proxy system 12.

Figure 3:
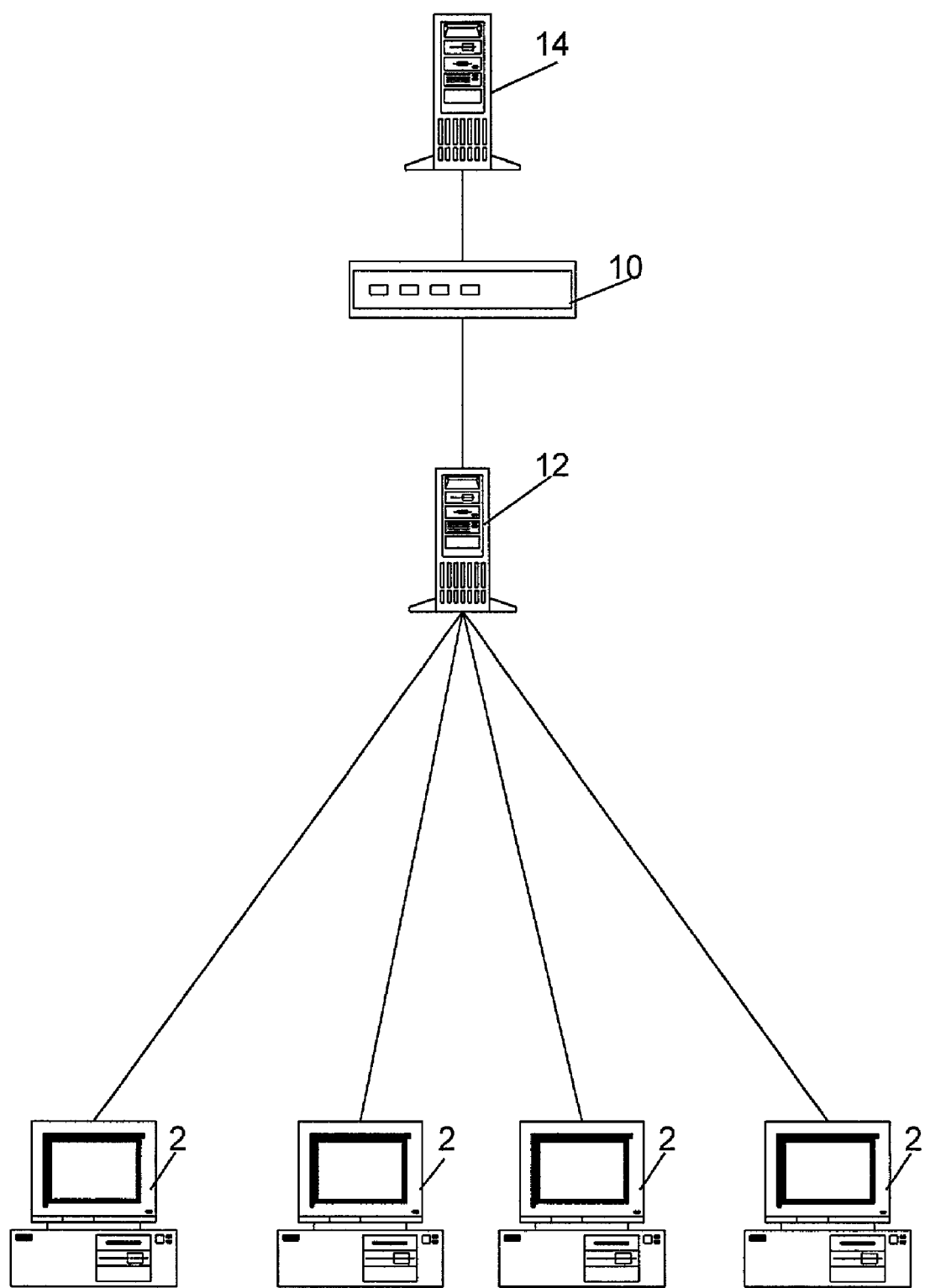
FIG. 3 is a diagram illustrating a plurality of passive FTP client system sessions multiplexed through a single outbound connection between two proxy servers.
Figure 4:
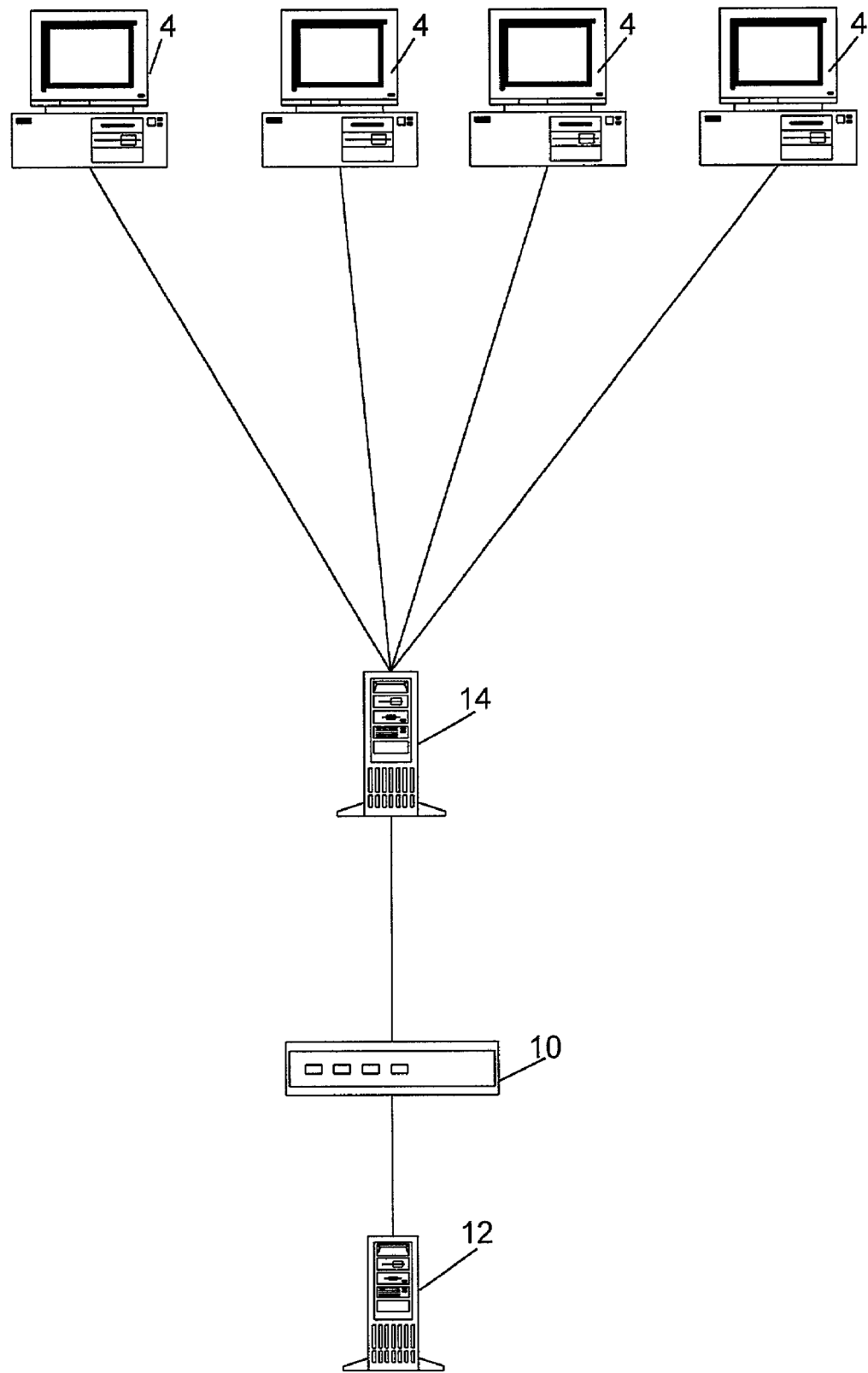
FIG. 4 is a diagram illustrating a plurality of FTP server sessions multiplexed through a single outbound connection between two proxy servers.

As shown in FIG. 3, multiple socket sessions between a plurality of passive FTP client systems 2 and a single FTP client proxy system 12 are forwarded over the single FTP proxy control connection to the FTP server agent 14. FIG. 4 illustrates multiple FTP sessions between a plurality of FTP servers 4 and a single FTP server agent 14 being forwarded over the FTP proxy control connection to the FTP client proxy system 12.

The FTP client proxy system 12 and FTP server agent 14 preferably manage multiple data sessions in a multi-threaded programming environment. For each outbound session request received from the FTP client proxy system 12, the FTP server agent 14 utilizes a new programming thread.

Methods of multi-threading multiple communication sessions between two systems through a single port on a firewall are well known by those skilled in the art.

After the FTP server agent 14 receives the encrypted FTP session request (including the URL of FTP server 4) from the FTP client proxy system 12, the FTP server agent 14 preferably decrypts the request and forwards the URL to request a FTP session with the desired FTP server 4. The FTP server 4 replies to the session request and establishes a command channel for FTP services. The FTP server agent 14 receives the FTP reply from the FTP server 4, preferably encrypts the reply, and forwards the reply to the FTP client proxy system 12 over the FTP command channel. The FTP client proxy system 12 forwards the reply originating from the FTP server 4 to the passive FTP client system 2, effectively establishing a command channel between the FTP server 4 and the passive FTP client system 2.

Thus, the command channel and physical connectivity between the passive FTP client system 2 and the FTP server 4 is established. The passive FTP client system 2 is able to formulate secure data requests on the FTP server 4, for example directory listings and files. The data requests are forwarded to the FTP client proxy system 12, through firewall 10, to FTP server agent 14 and delivered to the FTP server 4. When the FTP server 4 receives a request for data over the command channel, it replies by transmitting a new socket for communicating over the data channel. The reply is sent to the FTP server agent 14 where it is preferably encrypted and forwarded to the FTP client proxy system 12.

Prior to the FTP client proxy system 12 delivering the reply identifying the socket for data channel communications to the passive FTP client system 2, the FTP client proxy system 12 preferably stores the data packets received from the FTP server 4 in a memory. Moreover, the FTP client proxy system 12 preferably modifies the data packets by substituting its own IP address for that of the FTP server 4.

For example, the IP address of the FTP server 4 is 111.111.111.111 and the IP address of the FTP client proxy system 12 is 222.222.222.222. As noted above, the command channel will occur on logical communication port 21 (a well-known port for FTP session requests) on the FTP server 4. After a request for data is transmitted to the FTP server 4, a new logical communication port, e.g., 1025 is identified for data channel communications. The new socket on the FTP server 4 defining the data channel, i.e., 111.111.111.111:1025 is opened on the FTP server 4, identified and transmitted to the FTP server agent 14, and forwarded to the FTP client proxy system 12 therefrom. The FTP client proxy system 12 stores the new socket information in a memory, and modifies socket identified in the data packet to provide its own IP address with the same logical communication port identified by the FTP server 4, i.e., 222.222.222.222:1025.

Once this modification occurs, the FTP client proxy system 12 preferably spawns a new service via a new socket that corresponds to the logical communication port number that was identified by the FTP server 4 for communicating over the data channel. For example, the FTP client proxy system 12 thereafter listens for data requests on socket 222.222.222.222:1025. The FTP client proxy system 12 then preferably forwards the modified data packets to the passive FTP client system 2 for continuation in the FTP process.

The passive FTP client system 2 thereafter receives the modified data packets from the FTP client proxy system 12 and forms a data request, for example a directory listing, a file download, a file upload and the like. The passive FTP client program sends the data request to the socket that was received, i.e., the socket on the FTP client proxy system 12. Since the FTP client proxy system 12 is listening for data requests on the newly spawned socket, the request for FTP data services from the passive FTP client system 2 is received.

Thereafter, the FTP client proxy system 12 preferably forwards the the data request to the FTP server agent 14 over the FTP proxy control connection. Thereafter, the FTP server agent 14 preferably decrypts the FTP data request and forwards it to the appropriate FTP server 4 on the appropriate socket, in the above example, 111.111.111.111:1025. The process continues with the FTP server 4 replying to the data request by providing the requested data, and closing the socket.

The FTP server agent 14 thereafter encrypts the data received from the FTP server 4, forwards the data to the FTP client proxy system 12 which decrypts the data and forwards the data to the passive FTP client system 2. The FTP server 4 closes the socket used for the data channel, and the following data request is sent over the command channel. The process continues until the passive FTP client system 2 has performed all of its desired FTP services.

Thus, improvements over security in FTP services are provided by the present invention. A single outbound connection between the FTP client proxy system 12 and the FTP server agent 14 uses a single port on the firewall 10 and multiplexes a plurality of FTP sessions between a plurality of FTP servers 4 and a plurality of passive FTP client systems 2.

An example of the communication process including the interaction between the hardware devices and software modules is now described with reference to the flow chart in FIG. 5.

Upon starting the process of the present invention a passive FTP client system 2 makes a FTP connection request to the FTP client proxy system 12 (step S100). The FTP client proxy system 12 receives the session request, and provides a data entry display screen enabling a user to submit a URL of a desired FTP server (step S102). The FTP client proxy system 12 receives and encrypts the FTP session request and forwards it to the FTP server agent 14, effectively requesting a session with FTP server agent 14 (step S104). The FTP server agent 14 replies to the FTP client proxy system's 12 request and establishes the FTP proxy control connection (step S106). The FTP server agent 14 decrypts the FTP request and forwards the FTP connection request to the appropriate FTP server 4 (step S108). The FTP server 4 thereafter replies to the FTP request, establishing a command channel with the FTP server agent 14 (step S110). The FTP server agent 14 encrypts the FTP command channel reply from the FTP server 4 and forwards it to the FTP client proxy system 12. The FTP client proxy system 2 receives the FTP reply and forwards the command channel information to the passive FTP client system 2, thereby establishing a FTP session between the FTP server 4 and passive FTP client system 2 (step S112).

The passive FTP client system 2 formulates a data request (a directory listing) and sends the request to the FTP proxy client system 12 (step S114). The FTP client proxy system 12 encrypts the request and forwards it to the FTP server agent 14 (step S116). The FTP server agent 14 forwards the data request to the FTP server 4. The FTP server 4 replies by identifying and transmitting a new socket for the data channel (step S118). The FTP server agent 14 receives and encrypts the reply from the FTP server 4 and forwards it to the FTP client proxy server 12 (step S120).

Figure 5:
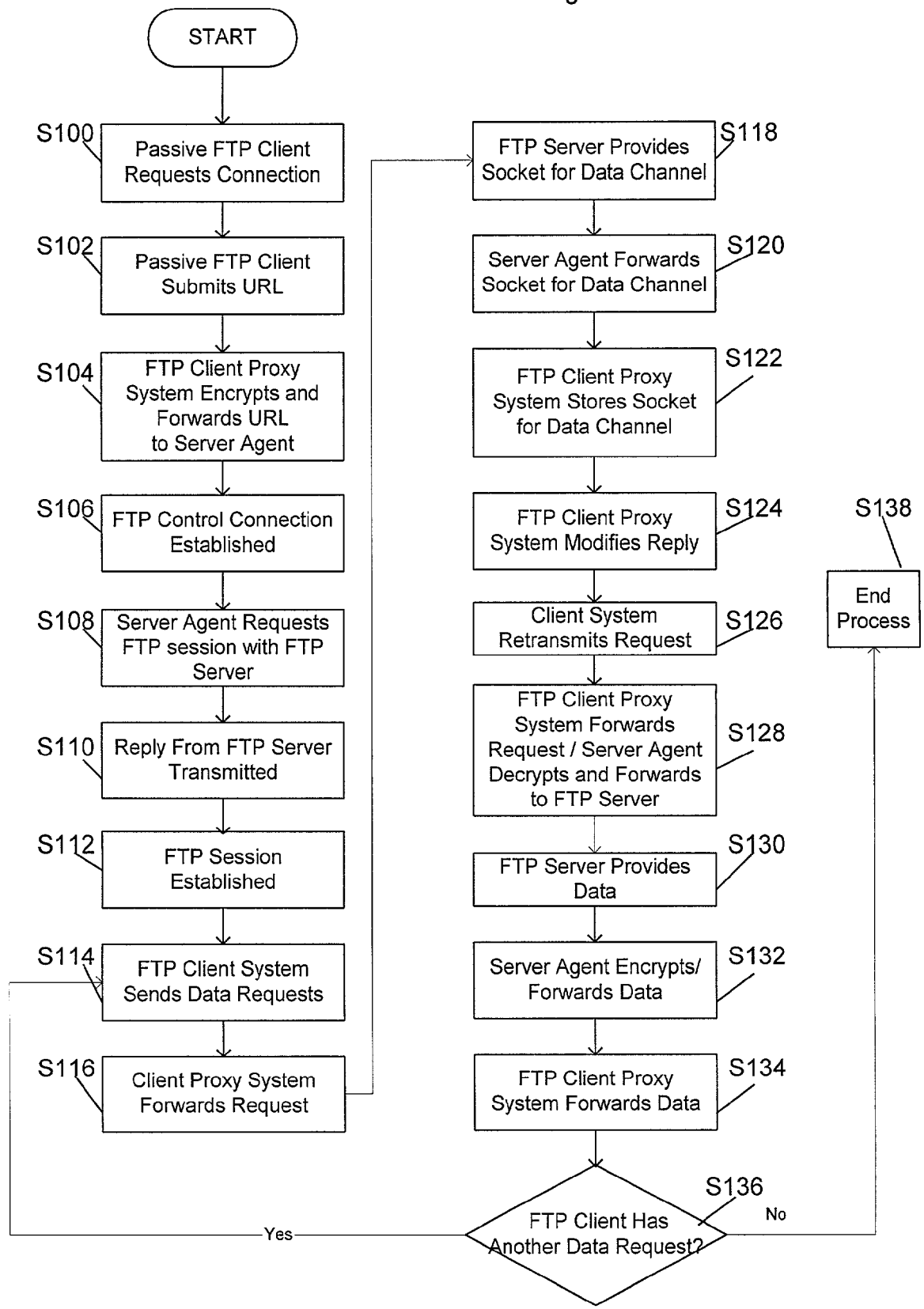
FIG. 5 is a flow chart of a secure file transfer protocol session implementing the security arrangement of the present invention.

Continuing now with the flowchart in FIG. 5, the FTP client proxy system 2 receives the FTP reply originating from the FTP server 4 and stores the identified FTP server 4 data channel socket in a memory (step S122). The FTP client proxy system 12 modifies the received data packets by substituting its own IP address for the IP address of the FTP server 4 (step S124). The FTP client proxy system 12 opens a new socket using the port number identified and transmitted by the FTP server 4 for the data channel. The modified reply is forwarded to the passive FTP client system 2. The passive FTP client system 2 retransmits the FTP data request on the newly opened socket on the FTP client proxy system 12 (step S126). The FTP client proxy system 12 receives the passive FTP client system 2 data request and forwards the modified FTP data request to the FTP server agent 14 through firewall 10, the FTP server agent 14 decrypts the request and, by using the socket stored by the FTP client proxy system 12, modifies and forwards the request to the data channel socket on the FTP server 4 (step S128).

The FTP server 4 thereafter provides the data requested by the passive FTP client system 2 and transmits the data to the FTP server agent 14 (step S130). The FTP FTP server agent 14 encrypts the data received from the FTP server 4 and forwards the data to the FTP client proxy system 12 through firewall 10 (step S132). The data are forwarded to the FTP proxy system 12, decrypted, and are forwarded to the passive FTP client system 2 (step S134). Thereafter, a determination is made whether the passive FTP client system 2 requests more data (step S136). If the passive FTP client system 2 requests additional data from the FTP server 4, the system loops back to step S114. In the event the passive FTP client system 2 has received all of the data it desires from the FTP server 4, then the session terminates (step S138).

The present invention and its accompanying procedures for improving secured FTP is provided. In particular, the passive FTP client systems 2 are protected from attacks by users in the public network because firewall 10 does not allow session request connections originating from the public network side. The FTP control connection is initiated from the private network side of the firewall 10 by the FTP client proxy system 12, connecting outward to the FTP server agent 14. Thus, even if a hacker were able to compromise FTP server agent 14, the hacker would not be unable to jump from FTP server agent 14 to the FTP client proxy system 12 because internal fire wall 10 is configured to deny inbound requests.

Furthermore, the present invention advantageously employs the use of software modules executing on the passive FTP client system 2, proxy client system 12 and FTP server agent 14 which provides seamless integration with the firewalls and proxy servers that are provided by service providers. In particular, these software modules function to allow multiple passive FTP client systems 2 to access destination FTP servers 4 using a single or minimal number of TCP/IP addresses and logical communication ports while simultaneously providing application level security and encryption services.

The present invention may be embodied in other specific forms without departing from the spirit or central attributes thereof.

What is claimed is:

1. A system providing secure transfer of data, said system comprising:
   a client system;
   a server;
   a security system interposed between said client system and said server for controlling communications between said client system and said server, said security system including:
   a first proxy system and a second proxy system, said first proxy system coupled between said client system and said second proxy system, and said second proxy system coupled between said server and said first proxy system;
   a firewall coupled between said first proxy system and said second proxy system, said firewall restricting data flow between said first proxy system and said second proxy system to outbound communications through a single port on said firewall;
   wherein all FTP data are transferred between said client system and said server through said single port on said firewall.

2. The system of claim 1, wherein said client system provides an identification of said server to said first proxy system;
   said first proxy system forwards said identification to said second proxy system through said single port on said firewall; and
   said second proxy system uses said identification to establish a data transfer session with said server.

3. The system of claim 2, wherein said server establishes a command channel with said client system through said security system.

4. The system of claim 2, wherein said server transmits a representation of a socket to be used for a data channel to said client system.

5. The system of claim 4, wherein prior to forwarding said represented socket to said client system, said first proxy system modifies said representation of said socket by substituting said first proxy system's IP address for said server's IP address.

6. The system of claim 5, wherein said client system transmits a request through said security system for data located on said server.

7. The system of claim 6, wherein said first proxy system forwards said modified request through said single port on said firewall to said server.

8. The system of claim 7, wherein said second proxy system modifies said request by substituting said server's IP address for said first proxy system's IP address.

9. The system of claim 8, wherein said server transmits data corresponding to said request to said second proxy system, and said data corresponding to said request for data is forwarded by said second proxy system through said single port on said firewall to said first proxy system.

10. The system of claim 9, wherein said first proxy system forwards said data corresponding to said request for data to said client system.

11. The system of claim 1, further comprising a plurality of servers and a plurality of client systems, wherein all data transferred between said plurality of servers and said plurality of clients are transferred through said single port on said firewall.

12. A method for providing secure transfer of data, said method comprising:
   using a client system to request data;
   using a server to provide data;
   controlling communications between said client system and said server using a security system, said security system including:
   a first proxy system and a second proxy system, said first proxy system coupled between said client system and said second proxy system, and said second proxy system coupled between said server and said first proxy system;

a firewall coupled between said first proxy system and said second proxy system, said firewall restricting data flow between said first proxy system and said second proxy system to outbound communications through a single port on said firewall;

using said security system to transfer said data between said client and said server; and restricting all flow of FTP data passing through said security system through a single port on said firewall.

13. The method of claim 12, further comprising providing to said first proxy system an identification of said server by said client system;

forwarding said identification to said second proxy system by said first proxy system through said single port on said firewall; and using said identification by said second proxy system to establish a data transfer session with said server.

14. The method of claim 13, further comprising establishing a command channel by said server with said client system through said security system.

15. The method of claim 13, further comprising transmitting a representation of a socket to be used for a data channel by said server to said client system.

16. The method of claim 15, further comprising modifying said representation of said socket by said first proxy system.

17. The method of claim 16, wherein said modifying step further comprises substituting said first proxy system's IP address for said server's IP address.

18. The method of claim 17, further comprising forwarding said modified represented socket to said client system.

19. The method of claim 18, further comprising transmitting a request through said security system for data located on said server by said client system.

20. The method of claim 19, further comprising modifying said request by said first proxy system, prior to forwarding said request.

21. The method of claim 20, wherein said modifying step further comprises substituting said server's IP address for said first proxy system's IP address.

22. The method of claim 21, further comprising forwarding said modified request through said single port on said firewall by said first proxy system to said server.

23. The method of claim 22, further comprising transmitting data corresponding to said request to said second proxy system by said server, and forwarding said data corresponding to said request by said second proxy system through said single port on said firewall to said first proxy system.

24. The method of claim 22, further comprising forwarding said data corresponding to said request by said first proxy system to said client system.

25. The method of claim 12, further comprising requesting data on a plurality of servers by a plurality of client systems.

* * * * *